3,181,991
PIGMENTED PEROXIDE COMPOSITIONS
Newton G. Leveskis, Richmond, Calif., assignor to U.S. Peroxygen Corporation, Richmond, Calif.
No Drawing. Filed Aug. 7, 1961, Ser. No. 129,522
6 Claims. (Cl. 252—430)

This invention relates to organic peroxide compositions. More particularly, it relates to stable organic peroxide compositions which contain pigments and to a method for using the compositions.

Essentially, the present invention provides organic peroxides such as benzoyl peroxide to which a coloration has been imparted by means of incorporating a relatively small proportion of a pigment with the peroxide. The pigmentation material is an organic or inorganic compound having a distinct color. There are many such pigmentation compounds known in the art. A classification including most of the known pigments is found in Protective and Decorative Coatings, Mattiello, volume 2, John Wiley & Sons, 1942, page 3 et seq. The pigments have heretofore been used for many purposes including dyes for fabrics, color bases for paints, and the like.

In the present compositions the purposes of the pigment is two-fold. First, the coloration in the peroxide composition enables the user of the peroxide to determine when the peroxide has been adequately dispersed in the medium to which it is added by observing the distribution of the color therein. For example, if the peroxide is used as a catalyst to cause polymerization, it is desirable to have a thorough and uniform distribution of the catalyst in the material to be polymerized. This object is easily accomplished with the present compositions as noted.

The second function of the coloration in the peroxide composition is to cause the polymerization product itself to become pigmented with a preselected color. By employing the present composition as catalysts, they simultaneously effect the desired pigmentation during the course of the catalysis reaction.

Heretofore, compositions of the present type which combine the highly reactive organic peroxides with a pigment have not been formulated. This was due to the fact that it was believed that the peroxides would oxidize or otherwise react with the pigment in some undesired way before the composition was used for its intended purpose. It was believed that the reaction between the peroxides and the pigments would result in a lowering of the active oxygen content of the peroxide and thereby reduce the utility of the peroxides or render them wholly unsuitable altogether.

The present invention is based on the discovery of a group of the many available pigments, such as outlined in the reference noted above, that are "compatible" with organic peroxides so that the combination thereof results in stable compositions in which the active oxygen in the peroxides is maintained at substantially the same value or level as a similarly handled and stored organic peroxide having no pigment. In other words, the present invention is based on the discovery of certain pigments that are inert with respect to organic peroxides.

As used throughout this specification and claims, the term "stable" indicates that the active oxygen content of the peroxide remains substantially constant or, in any event, does not decline in the compositions of the present invention at an appreciably greater rate than in the same organic peroxide without pigment under identical conditions. The term "compatible" pigment is used herein and in the claims to mean a pigment that forms a stable composition of the type provided by the present invention. The present invention is limited to compatible pigments in combination with an organic peroxide and optional additional elements to be described hereinafter.

More specifically, a compatible pigment is one that meets the following requirements in whole or in part:

I. For incorporation in anhydrous peroxide compositions, the pigment by itself (1) Does not fade in light.
(2) Does not contain azo or amino groups.
(3) Is not or does not contain a sulfide, selenide, or telluride group.
(4) Is in an oxidized form to the extent that oxidation readily occurs.

II. For incorporation in peroxide compositions containing water, the pigment by itself (1) Does not fade in light.
(2) Does not contain azo or amino groups.
(3) Is not or does not contain a sulfide, selenide, or telluride group.
(4) Is in an oxidized form to the extent that oxidation readily occurs.
(5) Imparts an acidic pH to an aqueous medium, i.e., less than 7.0.

By fading in light is meant a change in the color of the pigment within a reasonably short period of time and that is observable with the naked eye. The oxidation state contemplated is one that is normally obtainable without the use of extreme conditions. Thus, a pigment may be in a suitably oxidized form although it might be possible to somehow further increase the state of oxidation by means of special techniques or conditions.

Any pigment that meets one or more of the tests may be used in combination with an organic peroxide for the purposes herein stated. For best results, the selected pigment should satisfy all of the requirements in the appropriate category depending on whether the composition will or will not contain water. Very suitable pigments generally meet at least 75% of the requirement in either category. In other words, in an anhydrous peroxide composition, the pigment will satisfy 3 of the 4 requirements, and in a water containing composition it will satisfy 4 of the 5 requirements.

Preferred pigments are those which meet all or at least 75% of the requirements. Preferred pigments include the following among others:

Zinc oxide            Ferric ferrocyanide
Red iron oxide        Titanium dioxide
Black iron oxide      Barytes
Yellow iron oxide     Chrome orange
Metal-free phthalocyanine Any organic peroxide is suitable for use in the present compositions including symmetrical peroxides of the diacyl and dialkyl type, hydroperoxides, peracids, and the various aldehyde and ketone peroxides. Preferably, the organic peroxide selected is an aroyl peroxide or a fatty acid peroxide. Examples of suitable peroxides include:

Benzoyl peroxide         Perphthalic acid
Lauroyl peroxide         Methyl ethyl ketone peroxide
Di-tertiary butyl peroxide    Cumene hydroperoxide The pigment is combined with the organic peroxide in a relatively minor amount. Usually the pigment will be used in an amount just sufficient to impart color to the extent desired in the peroxide. However, since the pigment is stable and does not react with the peroxide, it is possible to make the combination in any ratio desired. Preferably, however, the pigment is combined with respect to the peroxide in an amount by weight from about 1% to 25% and most suitably between about 5% and 15%.

The composition is suitable for use in the form which results from the mixing of the pigment with the peroxide. This may be in powder form or liquid form for example. It is also possible to formulate the compositions as a paste. If the composition is initially in powder form this may require the addition of a diluent. Any suitable diluent may be used with the only requirement being that the diluent not react with the peroxide-pigment mixture.

The group of compounds known in the art as plasticizers are well adapted for use of a diluent. These materials are inert with respect to the peroxide-pigment mixture and, if the mixture is to be used in polymerization reactions, the addition of a plasticizer to the polymer product is generally beneficial. Suitable plasticizers include among others tricresyl phosphate, butyl benzyl phthalate, as well as other phthalates and various other esters normally employed as plasticizers.

The diluent selected may be used in any amount which produces the desired consistency of the final composition. It has been found that compositions containing somewhere on the order of about 50% by weight plasticizer diluents are very suitable.

As previously indicated, compositions containing water are contemplated as being within the scope of the present invention. While the amount of water is subject to considerable variation depending upon the particular materials involved and the ultimate use thereof, generally the water should constitute a minor amount of the composition. Suitably, the water will be less than about 25% by weight of the composition and preferably should be less than about 10% by weight.

The compositions of the present invention are prepared simply by physically mixing the appropriate ingredients. The compositions of the following examples were prepared by mixing the amounts of ingredients noted therein.

*Example I*

The following results listed in tabular form were observed with compositions prepared using benzoyl peroxide as the organic peroxide constituent. The peroxide was present in an amount constituting 50% by weight of the composition. The compositions also contained 45% by weight of a plasticizer diluent as indicated and 5% by weight of a pigment as indicated.

The prepared samples were placed in an oven and heated to 40° C. for two weeks. Controls were kept for comparison as to active oxygen content and color change. At the beginning of the test the compositions were all in paste form and contained 3.3% active oxygen.

| Pigment | Percent of compatibility requirements met by pigment | Plasticizer | Active oxygen content after two weeks, percent | Color change |
|---|---|---|---|---|
| Iron oxide red | 100 | Tricresyl phosphate | 3. | None. |
| Iron oxide black | 100 | Butyl benzyl phthalate | 3. | Do. |
| Iron oxide yellow | 100 | Tricresyl phosphate | 3. | Do. |
| Cadmium lithopone lemon | 75 | ___do___ | 3.26 | Yes. |
| Metallic copper | 75 | Butyl benzyl phthalate | 3.24 | Do. |
| Carbon black | 75 | ___do___ | 3.21 | Do. |
| Basic lead carbonate | 100 | Tricresyl phosphate | 3.3 | None. |
| Barytes | 100 | ___do___ | 3.3 | Do. |
| Phthalocyanine | 100 | ___do___ | 3.3 | Do. |
| Ferric ferrocyanide | 100 | ___do___ | 3.3 | Do. |
| Titanium dioxide | 100 | ___do___ | 3.3 | Do. |
| Malachite green lake | 50 | Butyl benzyl phthalate | 3.1 | Yes. |

*Example II*

Compositions were prepared as in Example I and tested at 45° C. for two weeks as in Example I. The organic peroxide was benzoyl peroxide. However, in this case only 40% by weight of the composition was plasticizer and 5% water was present.

| Pigment | Percent of compatibility requirements met by pigment | Plasticizer | Active oxygen content after two weeks, percent | Color change |
|---|---|---|---|---|
| Iron oxide red | 100 | Butyl benzyl phthalate | 3.3 | None. |
| Zinc oxide | 100 | ___do___ | 3.28 | Do. |
| Black iron oxide | 100 | ___do___ | 3.3 | Do. |
| Red iron oxide | 100 | ___do___ | 3.3 | Do. |
| Chrome orange | 100 | ___do___ | 3.25 | Do. |

*Example III*

To demonstrate the applicability of the present invention to organic peroxides in general, two compositions were prepared with one containing 50% 2,4-dichlorobenzoyl peroxide, 45% butyl benzyl phthalate, and 5% red iron oxide; the other composition contained 50% lauroyl peroxide, 45% butyl benzyl phthalate, and 5% red iron oxide. The samples were placed in an oven at 40° C. for two weeks. No change in active oxygen content or color were noted in either example.

This result was expected in view of the fact that the red iron oxide meets 100% of the requirements for a compatible pigment in a composition of the type tested.

As noted before, the present compositions find a principal use in polymerization, particularly where a peroxide is normally used as a catalyst. One broad area for such application is in the polymerization of vinyl compounds such as vinyl chloride, vinyl acetate, vinylidene chloride, styrene, methyl, ethyl, and other alkyl acrylates, other esters containing a vinyl group, and the like.

To practice the method of the present invention employing the compositions described hereinbefore, a catalytic amount of the composition is intermixed with the vinyl compound. The mixing is carried on until the pigment color is uniformly and thoroughly distributed throughout the mixture. This results in efficient catalysis of all of the vinyl material. In addition, the polymeric product obtained is colored by the pigment present in the catalytic peroxide composition.

The present compositions and the present method may be used as part of any of the known polymerization techniques including bulk polymerization and polymerization in aqueous emulsions. As an illustration of the present method, bulk polymerization of vinyl acetate is obtained by intermixing 100 parts of vinyl acetate with about 2 parts of a composition comprising benzoyl peroxide and 10% by weight red iron oxide. The peroxide composition is mixed with the vinyl acetate until the red iron oxide color is thoroughly distributed throughout the mixture. Heat is applied as required. The result is a pigmented vinyl acetate polymer.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. A stable catalyst composition consisting of a liquid organic peroxide and a wholly compatible non-white color pigment selected from the group consisting of red iron oxide, black iron oxide, yellow iron oxide, chrome orange, phthalocyanine and ferric ferrocyanide with which the active oxygen content of said peroxide remains substantially constant, said pigment constituting about 1–25% by weight of said organic peroxide.

2. A stable catalyst composition comprising an organic peroxide, a wholly compatible non-white color pigment selected from the group consisting of red iron oxide, black iron oxide, yellow iron oxide, chrome orange, phthalocyanine and ferric ferrocyanide with which the active oxygen content of said organic peroxide remains substantially constant in an amount just sufficient to impart a preselected amount of coloration to the composition, and a fluid diluent including a minor amount of water inert with respect to said organic peroxide and pigment.

3. A catalyst composition in accordance with claim 2 wherein said liquid diluent includes a plasticizer.

4. A stable catalyst composition in accordance with claim 2 wherein said pigment is about 1–25% by weight of said peroxide.

5. A stable catalyst composition in accordance with claim 2 wherein said organic peroxide is benzoyl peroxide and said diluent includes a plasticizer.

6. A stable catalyst composition in accordance with claim 2 wherein said organic peroxide is 2,4-dichloro benzoyl peroxide and said diluent includes a plasticizer.

References Cited by the Examiner

UNITED STATES PATENTS

| | | | |
|---|---|---|---|
| 2,319,142 | 5/43 | Lebach | 260—59 |
| 2,456,228 | 12/48 | Weaver | 260—40 |
| 2,537,520 | 1/51 | Eger | 260—40 |
| 2,720,500 | 10/55 | Cody | 260—40 |
| 2,809,179 | 10/57 | Endres et al. | 260—41.5 |
| 2,879,323 | 3/59 | Nichols et al. | 260—45.5 |
| 2,895,919 | 7/59 | Gerhart | 252—430 |
| 2,916,481 | 12/59 | Gilmont | 260—94.9 |
| 3,016,361 | 1/62 | Schweiker et al. | 260—40 |
| 3,039,989 | 6/62 | Eastman | 260—41 |
| 3,061,554 | 10/62 | Vartanian et al. | 252—426 |

FOREIGN PATENTS

| | | |
|---|---|---|
| 731,778 | 6/55 | Great Britain. |
| 1,130,802 | 2/57 | France. |
| 797,442 | 7/58 | Great Britain. |
| 809,559 | 2/59 | Great Britain. |
| 1,188,300 | 9/59 | France. |

OTHER REFERENCES

"Plastice Eng. Handbook," 3rd Edition, Reinhold Pub. Corp., New York, copyright January 28, 1960, pages 219–220.

TOBIAS E. LEVOW, *Primary Examiner.*

WILLIAM H. SHORT, SAMUEL H. BLECH,
*Examiners.*